(No Model.)
H. S. SQUIER.
Bridle Bit.
No. 241,745.  Patented May 17, 1881.
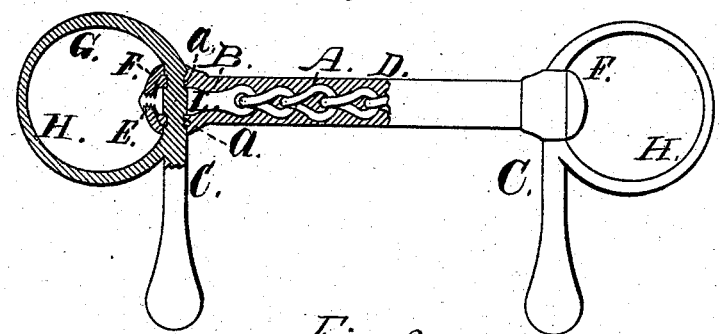
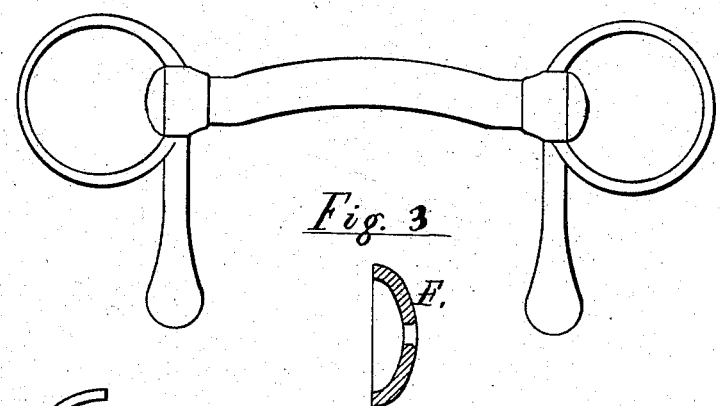
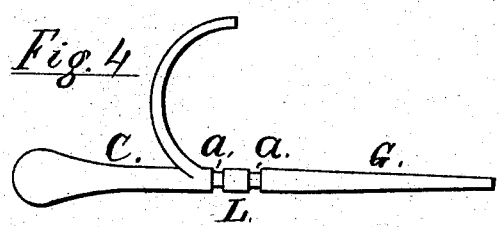
Attest:
John C. Tunbridge
Nathan Harper
Inventor.
Horace S. Squier
By Horace Hawes
Atty

UNITED STATES PATENT OFFICE.

HORACE S. SQUIER, OF NEWARK, NEW JERSEY.

BRIDLE-BIT.

SPECIFICATION forming part of Letters Patent No. 241,745, dated May 17, 1881.

Application filed July 21, 1880. (No model.)

*To all whom it may concern:*

Be it known that I, HORACE S. SQUIER, of Newark, in the county of Essex and State of New Jersey, have invented a new and useful Improvement in Bridle-Bits, of which the following is a specification.

My invention relates to bridle-bits having a flexible core for a mouth-piece of chain or other suitable material, and provided with hooks to engage the cheek-pieces, said hooks being provided on their outer extremity with a screw-threaded shank receiving a cap, and said mouth-piece or core being covered with rubber tubing, and to the method of constructing the cheek-pieces and uniting them with the mouth-piece; and it consists in the devices as herein set forth.

Figure 1 is a plan, partly in section, with a straight mouth-piece. Fig. 2 is a plan with a covered mouth-piece. Figs. 3, 4, and 5 are detailed views.

In my construction, A is a chain for a core of a mouth-piece, having the hooks B made to engage the cheeks C. Any form of cheeks may be used, and any form of mouth-piece.

On the hooks is a shank, E, screw-threaded to receive the cap F, which is used as a finish and as a covering or abutment of the end of the rubber tubing D, which is used to cover the core, making a complete mouth-piece. After the cap is screwed on the end of the shank is riveted down over it.

In the order of attaching the half-cheeks to the mouth-piece I construct it as shown in Fig. 4, leaving one half, G, of the eye or ring H extending out straight from the beam L and recesses $a$. The end of the hook B is closed down upon its shank, forming the eye K into which the section G is passed and bent and welded, completing the ring or eye H. The rubber tubing on the core, having at its connection with the cheeks a hole smaller than the eye K, rests in the recesses $a$, to preserve the hooks from any lateral movement and make a complete finish at the connection of cheek and mouth pieces.

What I claim as my invention, and desire to secure by Letters Patent, is—

1. In a bridle-bit, the combination of the flexible core, constructed substantially as described, and covered with rubber tubing, the hooks B, shanks E, and caps F, said caps forming a finish and covering or abutment for the end of the rubber, substantially as and for the purposes specified.

2. In the manufacture of bridle-bits, the half-cheeks provided with the straight section G, bearing L, and recesses $a$, substantially as shown and described, the sections G being adapted to be passed through the eye K and bent and welded, completing the ring or eye H, substantially as and for the purpose set forth.

HORACE S. SQUIER.

Witnesses:
JOHN C. TUNBRIDGE,
NATHAN HARPER.